United States Patent
Demmerling et al.

(10) Patent No.: US 11,299,691 B2
(45) Date of Patent: Apr. 12, 2022

(54) COOLANT FOR COMPOSITE MATERIALS

(71) Applicant: Rhenus Lub GmbH & Co KG, Mönchengladbach (DE)

(72) Inventors: Anna Lena Demmerling, Mönchengladbach (DE); Hans Jürgen Schlindwein, Mönchengladbach (DE); Thomas Hediger, Hilden (DE); Udo Quotschalla, Langenfeld (DE)

(73) Assignee: RHENUS LUB GMBH & CO KG, Mönchengladbach (DE)

( * ) Notice: Subject to any disclaimer, the term of this patent is extended or adjusted under 35 U.S.C. 154(b) by 581 days.

(21) Appl. No.: 15/992,931

(22) Filed: May 30, 2018

(65) Prior Publication Data
US 2018/0362877 A1 Dec. 20, 2018

(30) Foreign Application Priority Data
Jun. 6, 2017 (EP) .................................... 17174534

(51) Int. Cl.
*C10M 169/04* (2006.01)
*C10M 173/02* (2006.01)
(Continued)

(52) U.S. Cl.
CPC ........ *C10M 169/04* (2013.01); *C10M 105/72* (2013.01); *C10M 129/16* (2013.01);
(Continued)

(58) Field of Classification Search
CPC ............. B23B 2250/12; C10M 169/04; C10M 173/02; C10M 133/08; C10M 133/44; C10M 129/16; C10M 135/22; C10M 137/04; C10M 129/72; C10M 135/36; C10M 129/68; C10M 129/42; C10M 129/40; C10M 141/10; C10M 105/72;
(Continued)

(56) References Cited

U.S. PATENT DOCUMENTS 5,706,684 A   1/1998  Gong et al.
6,329,327 B1 * 12/2001  Tanaka ................. C10M 125/10
                                                                508/362
(Continued)

FOREIGN PATENT DOCUMENTS

CN         103695139 A    4/2014
DE    10 2008 011 781    9/2009
(Continued)

OTHER PUBLICATIONS

High Performance Chemical for Lubricants, Ketjenlube, Italmatch Chemicals Group 2013 (Year: 2013).*
(Continued)

*Primary Examiner* — Vishal V Vasisth
(74) *Attorney, Agent, or Firm* — Honigman LLP; Andrew N. Weber; Jonathan P. O'Brien

(57) ABSTRACT

The present invention concerns a coolant, present as an emulsion in the form of a concentrate, for machining fiber-reinforced plastics and material combinations containing fiber-reinforced plastics and metals; furthermore, the present invention also concerns a coolant, present as a solution in the form of concentrate, for machining fiber-reinforced plastics.

8 Claims, 4 Drawing Sheets

(51) Int. Cl.
| | |
|---|---|
| *C10M 173/00* | (2006.01) |
| *C10M 105/72* | (2006.01) |
| *C10M 129/16* | (2006.01) |
| *C10M 129/40* | (2006.01) |
| *C10M 129/42* | (2006.01) |
| *C10M 129/68* | (2006.01) |
| *C10M 129/72* | (2006.01) |
| *C10M 133/08* | (2006.01) |
| *C10M 133/44* | (2006.01) |
| *C10M 135/22* | (2006.01) |
| *C10M 135/36* | (2006.01) |
| *C10M 137/04* | (2006.01) |
| *C10M 141/10* | (2006.01) |
| *C10N 20/02* | (2006.01) |
| *C10N 20/04* | (2006.01) |
| *C10N 20/00* | (2006.01) |
| *C10N 30/06* | (2006.01) |
| *C10N 30/12* | (2006.01) |
| *C10N 30/16* | (2006.01) |
| *C10N 30/18* | (2006.01) |
| *C10N 30/00* | (2006.01) |
| *C10N 40/00* | (2006.01) |
| *C10N 40/22* | (2006.01) |
| *C10N 50/00* | (2006.01) |

(52) U.S. Cl.
CPC ........ C10M 129/40 (2013.01); C10M 129/42 (2013.01); C10M 129/68 (2013.01); C10M 129/72 (2013.01); C10M 133/08 (2013.01); C10M 133/44 (2013.01); C10M 135/22 (2013.01); C10M 135/36 (2013.01); C10M 137/04 (2013.01); C10M 141/10 (2013.01); C10M 173/00 (2013.01); C10M 173/02 (2013.01); B23B 2250/12 (2013.01); *C10M 2201/02* (2013.01); *C10M 2201/085* (2013.01); *C10M 2203/10* (2013.01); *C10M 2207/04* (2013.01); *C10M 2207/046* (2013.01); *C10M 2207/126* (2013.01); *C10M 2207/127* (2013.01); *C10M 2207/24* (2013.01); *C10M 2207/28* (2013.01); *C10M 2207/282* (2013.01); *C10M 2209/086* (2013.01); *C10M 2209/107* (2013.01); *C10M 2209/1075* (2013.01); *C10M 2215/042* (2013.01); *C10M 2215/10* (2013.01); *C10M 2215/223* (2013.01); *C10M 2215/26* (2013.01); *C10M 2215/30* (2013.01); *C10M 2219/022* (2013.01); *C10M 2219/024* (2013.01); *C10M 2219/082* (2013.01); *C10M 2219/104* (2013.01); *C10M 2219/106* (2013.01); *C10M 2223/04* (2013.01); *C10M 2223/043* (2013.01); *C10M 2225/04* (2013.01); *C10N 2020/02* (2013.01); *C10N 2020/04* (2013.01); *C10N 2020/091* (2020.05); *C10N 2030/06* (2013.01); *C10N 2030/12* (2013.01); *C10N 2030/16* (2013.01); *C10N 2030/18* (2013.01); *C10N 2030/24* (2020.05); *C10N 2040/00* (2013.01); *C10N 2040/22* (2013.01); *C10N 2050/01* (2020.05)

(58) Field of Classification Search
CPC ........ C10M 2219/024; C10M 2201/02; C10M 2215/26; C10M 2215/30; C10M 2207/04; C10M 2219/082; C10M 2223/04; C10M 2207/282; C10M 2219/106; C10M 2207/28; C10M 2207/127; C10M 2207/126; C10N 2040/20
See application file for complete search history.

(56) References Cited

U.S. PATENT DOCUMENTS

| | | |
|---|---|---|
| 7,109,152 B1 | 9/2006 | Corby et al. |
| 2012/0058924 A1* | 3/2012 | Kitamura ............ C10M 173/02 508/507 |
| 2017/0009175 A1 | 1/2017 | Andreson et al. |

FOREIGN PATENT DOCUMENTS

| | | |
|---|---|---|
| DE | 1020080H781 A1 | 9/2009 |
| EP | 3124583 | 2/2017 |
| EP | 3124583 A1 | 2/2017 |
| JP | 2015-086332 | 5/2015 |

OTHER PUBLICATIONS

COGNIS: "Breox® Product Range", Jan. 1, 2006.
European Search Report from EP 17174534.2 dated Dec. 8, 2018.

* cited by examiner

D: 2 mm
L: 240 mm
B: 25 mm

Lfree: 150 mm
Dcap strip: 2 mm
Lcap strip: 45 mm

COOLANT FOR COMPOSITE MATERIALS

TECHNICAL FIELD OF THE INVENTION

This invention pertains to coolants for the processing of fiber-reinforced plastics and material combinations and composites involving fiber-reinforced plastics and metals and to a method for processing such materials.

BACKGROUND OF THE INVENTION

The use of coolants in machining is widespread in the metalworking industry. The cooling and lubricating effect not only increases the service life of the tools but also improves the surface quality of the machined components. As of today, coolants are only used sporadically for machining operations involving fiber-reinforced plastics. According to a study carried out in 2014, more than 50% of users implement dry machining processes when it comes to CFRPs and only 16% implement flood coolant procedures. Owing to the extremely minute, respirable particles, dry machining processes need to be carried out in proper enclosures. Furthermore, an extraction of the FRP dust from the cutting machines is also necessary. Often, delamination and protruding, uncut fibers are common finishing flaws resulting from the dry machining process. Owing to the abrasiveness of the hard fibers, the degree of tool wear is high. As a result, expensive tools made of polycrystalline diamond or manufactured with special coatings and geometric designs need to be used. Without these tools, the machining process involving such materials is subject to many limitations.

In principle, it is possible to use water for cooling tools. This, however, would facilitate the corrosion of the tools, workpieces and machines used. Indeed, it would be desirable to also process materials such as carbon-fiber-reinforced plastic (CFRP) and glass-fiber-reinforced plastic (GRP) composites with metal without using the previously mentioned special tools. The specific challenge in this regard is the presence of different materials in the composite.

At present, composite manufacturers and the finishing industry still have many reservations and are reluctant to see the widespread use of coolants in machining processes involving CFRPs. One of the main reasons given is that, basically, a reaction with the resin cannot be ruled out. The fibers themselves, though, are chemically inert. Consequently, there are concerns that the components of the lubricant can compromise the strength of the composite material or that there can be a potential concentration of lubricant components in the composite matrix which could have a negative impact on the mechanical properties of the composite.

The object of the invention is therefore to provide a process or coolants that would facilitate the machining of CFRP and GRP materials without the use of specially designed tools. Furthermore, the objective is to also provide a coolant that ensures high-quality machining even when the fiber-reinforced composites contain metals.

BRIEF SUMMARY OF THE INVENTION

It has been determined that selected compositions of cooling lubricants are suited for the machining of fiber composites as well as composite materials consisting of fiber composites with all types of metal reinforcements, metal fillings and/or metal layers—hereinafter referred to as "stack"—and that no specially designed tools are required for the machining of these composite materials.

The object of the invention is thus a cooling lubricant for machining fiber-reinforced plastics and stacks. This coolant is available as a concentrate in the form of an emulsion. The coolant for fiber-reinforced plastics in the form of an emulsion contains oil components, amino alcohols, corrosion inhibitors, emulsifiers, defoamers and biocides, whereby the coolant also contains:

(a) a sulfurized hydrocarbon with 4 to 30 carbon atoms and 1-5 sulfur atoms and/or a sulfurized triglyceride with 10 to 20 carbon atoms in the fatty acid residue,
(b) an ethoxylated and/or propoxylated alkyl phosphate with 12 to 30 carbon atoms in the alkyl radical,
(c) a phosphoric acid ester with fatty alcohol polyglycol ether,
(d) a maleic acid dibutyl ester, polymerized with $C_{10\text{-}20}$-1-alkenes, and
(e) an epoxidized ester.

The invention pertains to the coolant concentrate and its ready-to-use aqueous dilutions.

Surprisingly, it was found that the said coolant is suited for processing not only fiber-reinforced plastics but also material combinations containing fiber-reinforced plastics and metals.

Furthermore, the object of the invention is a coolant that exists as an aqueous solution in the concentrate and is particularly suited for machining fiber-reinforced plastics. This coolant in the form of an aqueous solution includes one or more amino alcohols, corrosion inhibitors, defoamers, biocides and a polyethylene oxide-polypropylene oxide polymer, hereinafter referred to as polyalkylene glycol. At 40° C., the polyalkylene glycol has a kinematic viscosity of 1,000 to 5,000 $mm^2/s$ in accordance with ASTM D445 and a molecular weight of 5,000 to 10,000 g/mol (number average molecular weight). This coolant is free or essentially free of mineral oils, vegetable oils and fats.

The invention pertains to the aqueous coolant concentrate and its ready-to-use aqueous dilutions.

Furthermore, the object of the invention is a process that involves the application of the said coolant for machining fiber-reinforced plastics and material combinations containing fiber-reinforced plastics and metals.

The invention also pertains to the use of the said coolant, present as an emulsion in the concentrate, for machining fiber-reinforced plastics and material combinations containing fiber-reinforced plastics and metals.

Finally, the invention pertains to the use of the said coolant, present as a solution in the concentrate, for machining fiber-reinforced plastics.

Use of the said cooling lubricants facilitates the dissipation of heat resulting from the machining process; a lubricating effect between the relevant tools and materials reduces friction and consequently tool wear. At the same time, dust suppression reduces health risks. Moreover, it is possible to enhance the cutting speed, feed rate and machining quality during the machining process. This also results in a decrease in the number of rejects and longer tool life. Summing up, it can be said that the use of coolants in machining processes involving fiber-reinforced plastics is instrumental in improving efficiency, productivity and occupational health and safety.

DETAILED DESCRIPTION OF PREFERRED EMBODIMENTS

The said coolant in the form of an emulsion is a mineral-oil-based, EP (extreme-pressure) coolant that contains no boron and no formaldehyde depot substances. It is available in the form of an emulsion with very good flushing properties. It is suited for machining fiber-reinforced plastics as well as for machining material combinations involving plastics/fiber-reinforced plastics and aluminum, steel and/or titanium. In its application concentration, the said coolant displays a high rate of foam decomposition. Furthermore, the said coolant displays good aluminum and skin compatibility and is also characterized by a pleasant odor.

In the form of a concentrate, the composition of the said coolant can be as follows: The sulfurized hydrocarbon possesses 4 to 30 carbon atoms and 1 to 5 sulfur atoms. This primarily involves hydrocarbon chains in which one or more carbon atoms are replaced by one or more sulfur atoms. Such sulfurized hydrocarbons, for instance dialkyl polysulfides with the aforementioned number of carbon atoms, are commercially available. Alternatively or as a mixture with the previously mentioned sulfurized hydrocarbon, a sulfurized triglyceride with 10-20 carbon atoms can be used in the fatty acid residue. This sulfur-containing additive can have a sulfur content of 10 to 40 wt %. It is also possible to use diverse sulfurized hydrocarbons in the mixture. In this regard, the sulfurized hydrocarbon may contain 4 to 15 wt % relative to the weight of the coolant.

An ethoxylated and/or propoxylated alkyl phosphate with 12 to 30 carbon atoms in the alkyl radical constitutes an additional component of the coolant referred to in the present invention. This involves phosphoric acid esters in which at least one hydroxyl group of the phosphoric acid is esterified with an alkylene oxide that includes at least one propylene oxide unit and one alkyl chain. Such compounds, for instance the product Fosfodet® marketed by Kao Chemicals GmbH, are commercially available. The ethoxylated and/or propoxylated alkyl phosphate can be used with 0.5 to 6 wt %, preferably 2 to 5 wt %, relative to the weight of the coolant.

An ethoxylated alkyl phosphate constitutes an additional component of the coolant referred to in the present invention. This may be mixed phosphoric acid ester compositions with oleyl alcohol polyglycol ether. Such compounds, for instance the product Hordaphos® marketed by Clariant Produkte (Deutschland) GmbH, are commercially available. The ethoxylated alkyl phosphate can be used in the coolant referred to in the present invention with 0.5 to 6 wt %, preferably 1 to 4 wt %, relative to the weight of the coolant.

A maleic acid dibutyl ester, polymerized with $C_{10-20}$-1-alkenes also constitutes an essential component of the coolant referred to in the present invention. Such compounds are commercially available and marketed, for instance, under the product name Ketjen-Lube® by Italmatch Chemicals, Italy. The maleic acid dibutyl ester/$C_{10-20}$-1-alkene copolymer can be used in the coolant referred to in the present invention with 2 to 6 wt %, preferably 3 to 5 wt %, relative to the weight of the coolant.

Finally, an epoxidized ester constitutes an essential component of the coolant referred to in the present invention. Suitable epoxidized esters include, preferably, epoxidized triglycerides, whereby the fatty acids should ideally possess 14 to 20 carbon atoms. In the context of the present invention, suitable epoxidized triglycerides are, for instance, the brand Edenol® that is marketed by Emery Oleochemicals GmbH. The epoxidized ester can be used with 1 to 6 wt %, preferably 2 to 3 wt %, relative to the weight of the coolant. Epoxidized esters act as mercaptan scavengers.

Furthermore, the coolant concentrate may contain 5 to 20 wt % water. The concentrate is a water-in-oil emulsion that is miscible with water. For application purposes, the coolant is to be diluted with water. Upon dilution with water, an oil-in-water emulsion is obtained.

Apart from the previously mentioned components, the coolant referred to in the present invention also contains additional components. Among them are substances often used in cooling lubricants, for instance an oil component, amino alcohol, corrosion inhibitors, emulsifiers, defoamers and biocides.

In this regard, mono/di/trialkanolamines and related mixtures and other alkanolamines may be used as an amino alcohol. Other alkanolamines include, in particular, aminooctanol, dibutylethanolamine, dicyclohexylamine and related mixtures. The latter can also be used as a mixture with mono, di and trialkanolamines. Amino alcohols, together with acids in the coolant, form buffer mixtures. Monoisopropanolamine, methyldiethanolamine or triethanolamine and related mixtures, for instance, may be used as amino alcohols whereof the coolant concentrate may contain 10 to 25 wt % based on the weight of the coolant.

The proportion of corrosion inhibitors may be 5 to 20 wt % relative to the weight of the coolant concentrate. Corrosion inhibitors commonly used in coolants include, for instance, mono/di/tricarboxylic acids, triazole derivatives (benzotriazole), natural and synthetic sodium petroleum sulfonates or fatty acid amides.

Stabilizers or biocides with 0.1 to 20 wt % relative to the weight of the coolant concentrate may be used. Suitable stabilizers are, for instance, phenoxyethanol, phenoxypropanol, isothiazolinones (e.g. benzisothiazolinone, butyl-benzisothiazolinone) iodocarbamate, sodium pyridinethione and o-phenylphenol.

Vegetable, animal, mineral and synthetic oils may be used as lubricating oils. The proportion of the lubricating oil may be 5 to 40 wt % relative to the weight of the coolant concentrate.

Emulsifiers with 10 to 30 wt % relative to the weight of the coolant concentrate may be used.

To produce the ready-to-use coolant, it is recommended to initially provide water and subsequently add the coolant concentrate in the form of an emulsion under constant stirring. For this purpose, a conventional coolant mixer such as a venturi mixer or a metering pump may be used.

The coolant in the form of an aqueous solution is free or essentially free of a conventional lubricant. Conventional lubricants include, for instance, vegetable and animal oils and fats and mineral and synthetic oils. Essentially free of a conventional lubricant signifies that the content of the conventional lubricant in the coolant concentrate is less than 2 wt %, preferably less than 1 wt % and, ideally, less than 0.5 wt % relative to the weight of the coolant concentrate.

In the water-soluble coolant concentrate, the same additives, such as amino alcohol/s (alkanolamines), corrosion inhibitors, defoamers and biocides may be used as for the coolant referred to in the present invention, which is provided as a concentrate in an emulsion.

An essential component of the water-soluble coolant according to the present invention is a water-soluble polyethylene oxide-polypropylene oxide polymer which, at 40° C., possesses a kinematic viscosity of 1,000 to 5,000 mm²/s in accordance with ASTM D445 and a molecular weight of 5,000 to 10,000 g/mol (number average molecular weight). In accordance with ASTM D445, the kinematic viscosity of the polyalkylene glycol at 40° C. should preferably be 1,500 to 3,000 mm²/s and its molecular weight should preferably be 6,000 to 9,000 g/mol (number average molecular weight).

The concentration of the water-soluble polyalkylene glycol in the aqueous coolant may be 10 to 30 wt % relative to the weight of the coolant concentrate. Preferably, the concentration should be 10 to 20 wt %.

According to another preferred embodiment of the invention, the water-soluble coolant may contain a phosphorus additive in the form of phosphoric acid, the amino alcohol salts thereof or a common phosphoric acid compound other than a phosphorus additive. The concentration of the phosphoric acid in the aqueous coolant may be 0.1 to 4 wt % relative to the weight of the coolant concentrate. Preferably, the concentration should be 0.5 to 2 wt %.

Corrosion inhibitors may be present at 1.5 to 6 wt % relative to the weight of the coolant concentrate. In this regard, it is preferable to consider using acid compounds marketed under the product name IRGACOR®. Preferably, additional corrosion inhibitors such as sebacic acid and isononanoic acid are used. Sebacic acid may be used in a concentration of 2 to 4 wt %, preferably 3 wt %, relative to the weight of the coolant concentrate. Isononanoic acid may be used in a concentration of 3 to 8 wt %, preferably 5 wt %, relative to the weight of the coolant concentrate. In addition, a triazole compound may also be used as a corrosion inhibitor. Triazoles, for instance benzotriazole, with 0.2 to 1 wt % relative to the weight of the coolant concentrate may be used.

The coolant concentrate should preferably contain monoethanolamine and triethanolamine as alkanolamines. Monoethanolamine may be used in a concentration of 3 to 10 wt %, preferably 5 to 8 wt %, relative to the weight of the coolant concentrate. Triethanolamine may be used in a concentration of 2 to 40 wt %, preferably 20 to 35 wt %, relative to the weight of the coolant concentrate.

Furthermore, the coolant concentrate also contains biocides. Preferably, iodocarbamate, iodocarbamate compounds and isothiazolinone are to be used in their usual concentrations in the coolant concentrate. Moreover, it is also possible to use a defoamer in the coolant concentrate.

FIG. 1 shows a comparison of the bore hole diameters (for an increasing number of bore holes) resulting from dry machining, the use of a coolant according to this invention in the form of an emulsion (rhenus XT 46 FC) and the use of a coolant according to this invention in the form of a solution (rhenus XY 190 FC). In all cases, a carbon fiber-reinforced plastic laminate with a thickness of 10 mm was used as a specimen.

FIG. 2 shows the machining quality following milling with the dry machining process, with the use of a coolant according to this invention in the form of an emulsion (rhenus XT 46 FC) and with the use of a coolant according to this invention in the form of a solution (rhenus XY 190 FC). In all cases, a carbon fiber-reinforced plastic laminate with a thickness of 10 mm was used as a specimen for a feed path of 17 meters and 48 meters.

The term water-soluble in the sense of the invention shall mean as far as polyalkyleneoxides are concerned a solubility of more than 0.1 mmol/l at a temperature of 20° C.

The invention will be further explained by the following examples.

EXAMPLES

Example 1—Composition of the Coolant (Emulsion)

The composition of a feasible concentrate of the coolant according to the invention is shown in the following table. The substances specified in the table are to be mixed together under vigorous stirring. The figures in the table represent % by weight based on the weight of the coolant concentrate that is in the form of an emulsion.

| Water | 11.42 |
|---|---|
| Monoisopropanolamine | 2 |
| Methyl diethanolamine | 10 |
| Triethanolamine (pure, 90%) | 9.7 |
| Benzotriazole (corrosion inhibitor) | 0.9 |
| IRGACOR ® L 190-85 (corrosion inhibitor) | 2.1 |
| Mineral oil | 6 |
| Phenoxyethanol | 10 |
| SNS 520 (corrosion inhibitor) | 5 |
| TPS 20 (dialkyl sulfide) | 4 |
| TPS 32 (dialkyl sulfide) | 8 |
| Edenol ® D 81 (epoxidized ester) | 4 |
| Lubrhophos ® LB 400 E ALL (phosphoric acid ester) | 2 |
| Diacid ® 1550 (corrosion inhibitor) | 3 |
| Fosfodet ® RS 0602 (alkyl phosphate) | 4 |
| AC 101 (corrosion inhibitor) | 4 |
| Emulsifier | 9 |
| Maleic acid dibutyl ester | 4 |
| Benzisothiazolinone | 0.49 |
| Butylbenzisothiazolinone | 0.09 |
| Defoamer | 0.3 |

For application purposes, the concentrate is to be diluted with water in a weight ratio of 1:9.

Example 2—Composition of the Coolant (Solution)

The composition of a feasible water-soluble concentrate of the coolant according to the invention is shown in the following table. The substances specified in the table are to be mixed together under vigorous stirring. The figures in the table represent % by weight based on the weight of the coolant concentrate

| Water | 34.11 |
|---|---|
| IRGACOR ® L 190-85 (corrosion inhibitor) | 4 |
| Monoethanolamine | 6.9 |
| Triethanolamine | 30 |
| Sebacic acid (corrosion inhibitor) | 3 |
| Isononanoic acid (corrosion inhibitor) | 5 |
| Tolyltriazole | 0.7 |
| BREOX 75W 2050 (PAG) | 15 |
| Defoamer | 0.2 |
| Iodocarbamate | 0.6 |
| Benzisothiazolinone | 0.49 |

For application purposes, the concentrate is to be diluted with water in a weight ratio of 1:9.

Example 3—Quality Test for Drilling

Figure 1:
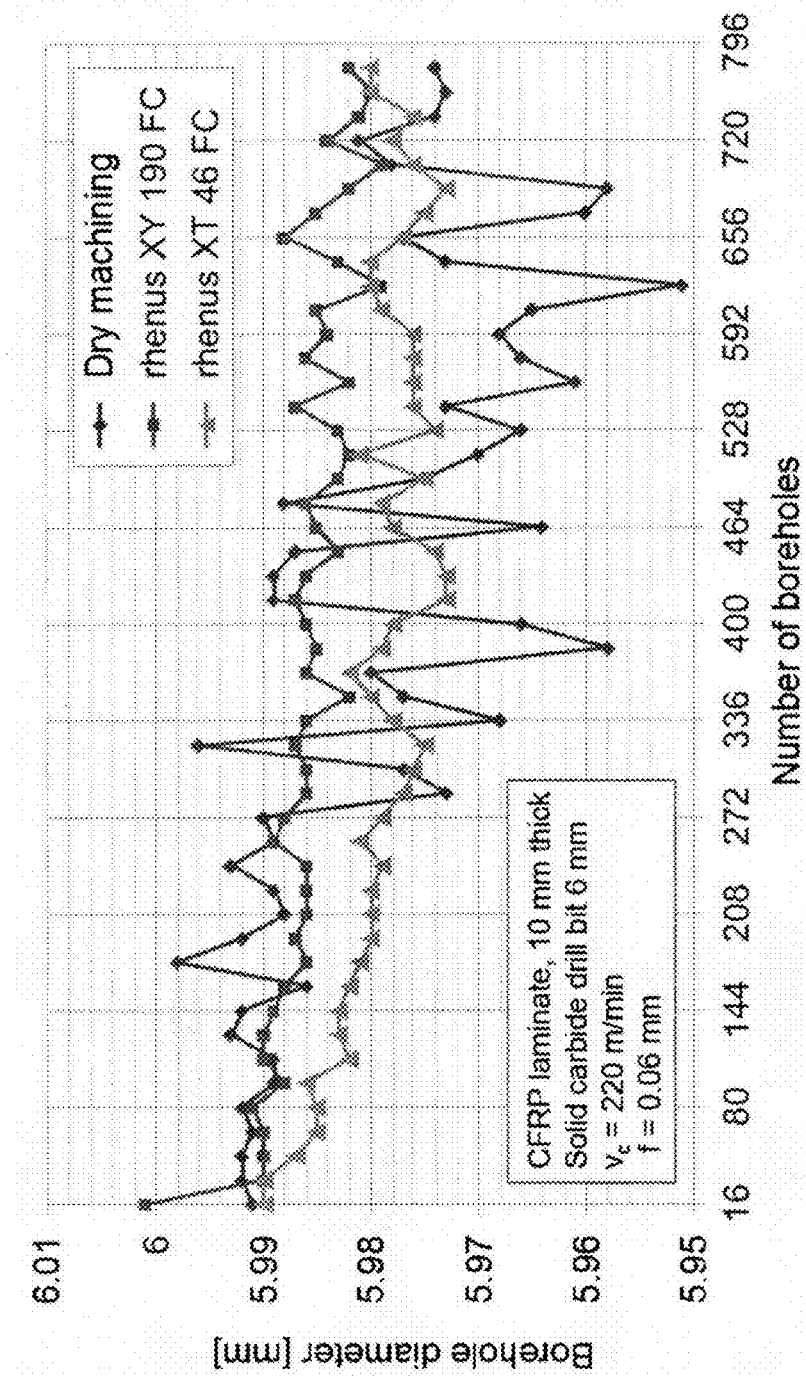

The machining quality for drilling of a 10-mm-thick carbon fiber-reinforced plastic plate was tested in three runs: without a coolant, with the coolant according to the invention, called rhenus XT 46 FC (Example 1), and with a fully water-soluble coolant, called rhenus XY 190 FC in FIG. 1. For each of the three test runs, a new, solid carbide, 6-mm drill bit was used at a drilling speed $V_c$ of 120 m/min. More than 720 holes were drilled with each bit and the diameter of the boreholes was subsequently determined. The graph in FIG. 1 shows that, during the dry drilling process without the use of a coolant, an increase in the number of boreholes also results in greater fluctuations in the borehole diameter. These fluctuations in terms of the borehole diameter are significantly greater in contrast to drilling operations with a coolant.

Example 4—Quality Test for Milling

The machining quality for milling of a 4-mm-thick carbon fiber-reinforced plastic plate was tested. For each test, a new, solid carbide tool and a new workpiece of the same batch was used. The edges of the workpieces (CFRP plate) were machined without changing the infeed, forward feed and milling speed. In this regard, the following parameters were considered:
Plate thickness: CFRP, 4 mm
Tool: Gühring VHM milling cutter, z=2, Ø 6 mm, (302958832 WN R-CR1 6.0-13.0 K/P16073262)
Cutting parameters: Cutting speed $v_c$=190 m/min, forward feed $f_z$=0.06 mm, infeed $a_e$=1.0 mm
Criteria for stopping the test: Maximum wear-land width $VB_{max}$=0.2 mm or maximum feed path $L_F$=48 m.

Figure 2:
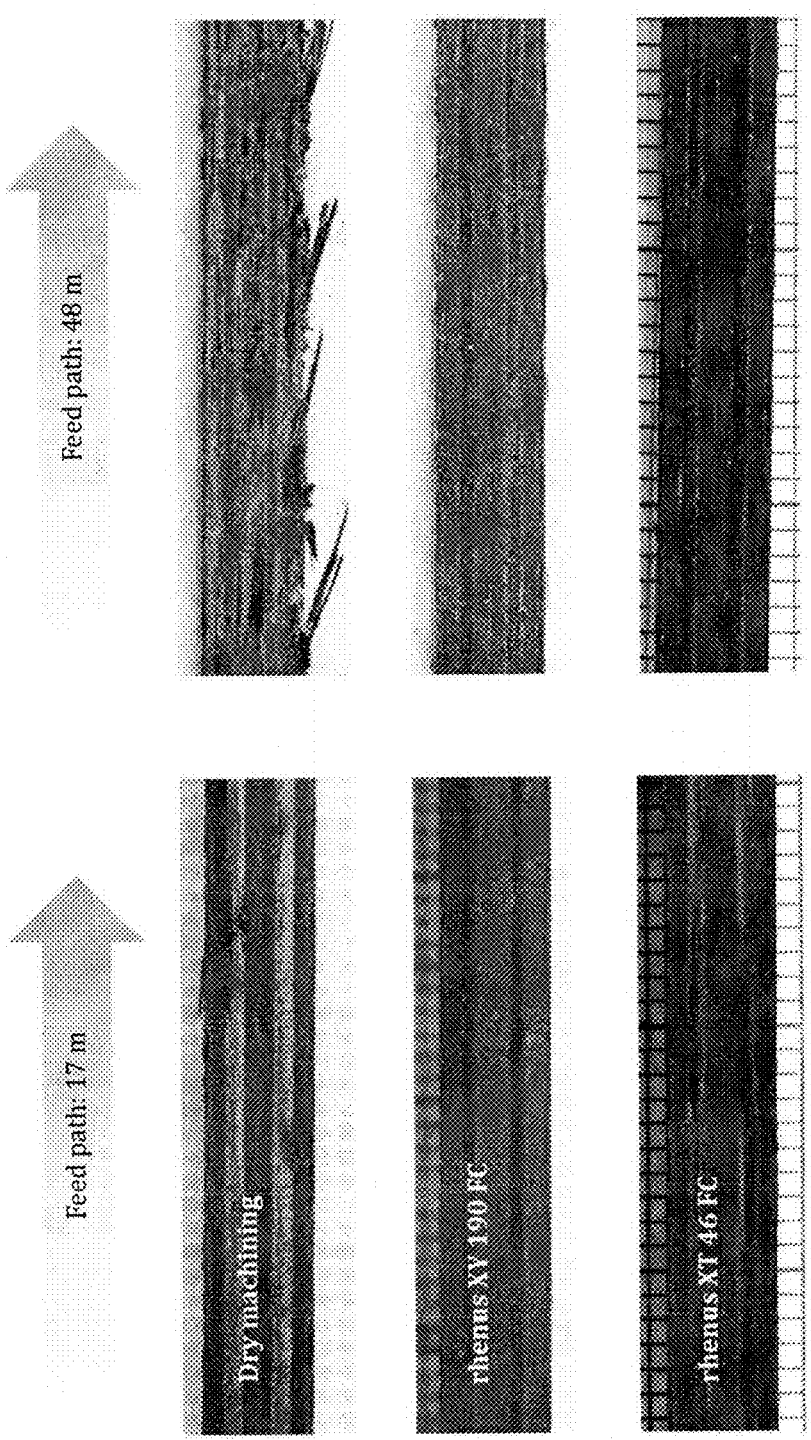
Figure 3:
FIG. 3 shows the borehole walls in test specimens following drilling with the coolants according to this invention and with conventional coolants (both in the form of an emulsion and a solution) used for machining steel and aluminum. The borehole walls show that the coolants according to this invention are particularly suited for machining fiber-reinforced composites.

In each case, a visual check was performed after a feed path of 17 meters and 48 meters. The tests were performed to evaluate the machining quality for milling without a coolant, with the coolant according to the invention, called rhenus XT 46 FC in FIG. 2, and with a fully water-soluble coolant, called rhenus XY 190 FC in FIG. 2. The images of the milled edges show that, in contrast to dry machining, the use of the coolant according to the invention, rhenus XT 46 FC, has resulted in a significantly smoother edge after a feed path of 48 meters.

Example 5—Industrial Field Test with Rhenus XT 46 FC from Example 1

| Tool | Cutting data without coolant | Cutting data with coolant | Without coolant | With coolant |
|---|---|---|---|---|
| VHM milling cutter, pyramid-toothed, ø 6 | 8500 1/min 1200 mm/min | 13500 1/min 2000 mm/min | 6 pieces = 42 m | 40 pieces = 150 m |
| VHM milling cutter, ø 4.8 | 7600 1/min 700 mm/min | 7600 1/min 700 mm/min | 10 pieces = 1.7 m | 40 pieces = 6.8 m |

Figure 4:
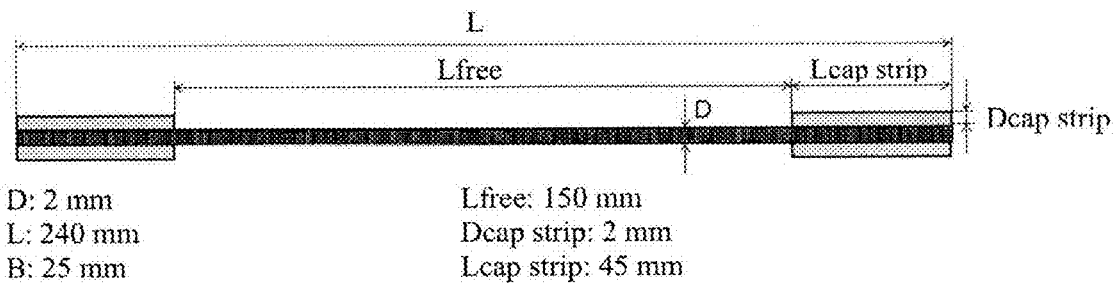
FIG. 4 shows a schematic representation of a tensile test specimen in accordance with DIN EN 2561.

The following advantages of the coolant according to the invention can be achieved:
Reduced delamination consequently implies that less reworking is required
Reduced tool wear also leads to reduced tool costs
Enhanced cutting performance leads to faster production time
Lower production costs
Very good flushing properties
Cleaner equipment and production facilities
Dust suppression Example 6—Transverse Tensile Tests for Testing the Fiber-Matrix Composite In tensile testing procedures in accordance with DIN EN 2561, the tensile force introduced to the specimen is perpendicular to the direction of the fiber. The force is gradually increased until a fracture is observed in the specimen. The aim of this procedure is not to test the strength of the fiber but the cohesion of the fiber-matrix interface. A schematic representation of a tensile test specimen is shown in FIG. 4.

With readings for force (F) and strain (ε)—and with the known value of stress acting on the specimen cross-section (S)—it is possible to determine strength (σ) and rigidity (E):

$$\text{Tensile strength } [MPa] \quad \sigma = \frac{F}{S}$$

$$\text{Tensile rigidity } [MPa] \quad E = \frac{F_{0,5} - F_{0,1}}{S \cdot (\varepsilon_{0,5} - \varepsilon_{0,1})}$$

The factors 0.1 and 0.5 stand for the force measured respectively at 10% and 50% of the failure load.

Figure 5:
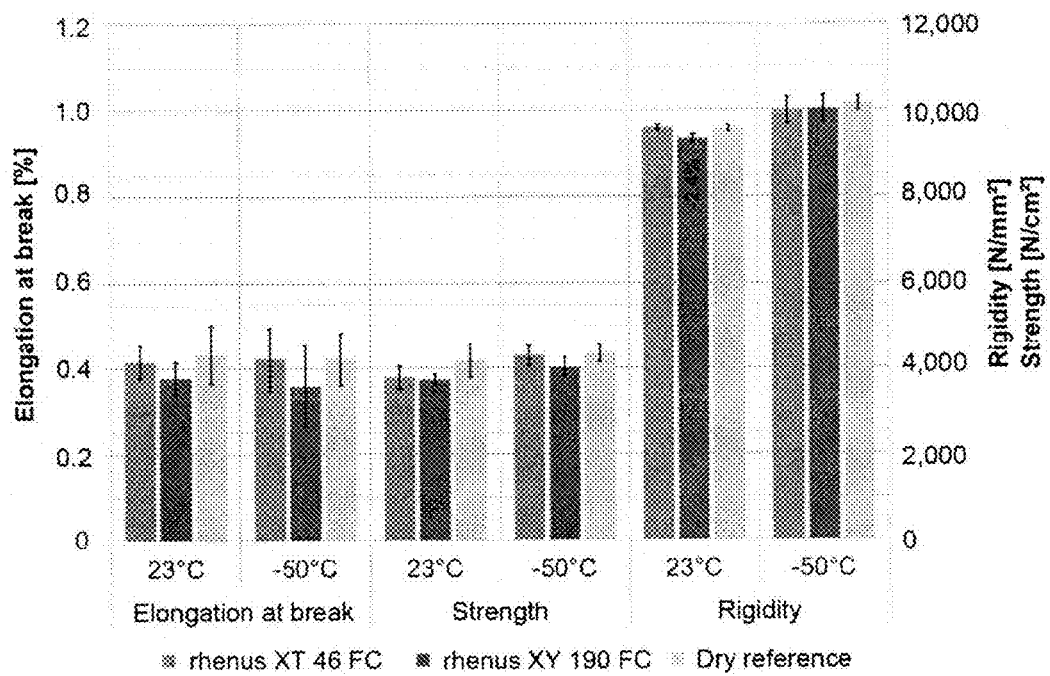
FIG. 5 shows the material properties of the conditioned tensile test specimens (stored in 10% coolant at 60° C. for 1 week).

The tensile tests were performed with Zwick testing machines (type: 1476 and 1484). The tests were performed at room temperature and in a climate chamber at −50° C. The mean values of the material properties are based on at least six separate readings and are presented in FIG. 5.

The bar graph shows that the material properties of the specimens treated with the coolants differ from those that were subject to dry machining. The material properties of the specimens treated with the coolants tend to be below the reference values. In order to determine whether these differences are random or characteristic, the level of significance was analyzed with an error probability of 1%. To this effect, a two-tailed Student's t-test assuming equal variances was carried out and the level at which the mean values are only just significantly different was calculated. The mean values do not differ significantly if the calculated p-values exceed the error probability level. Statistically, the differences that are identified occur randomly. The results and conclusions of the individual tests are presented in Table 1.

TABLE 1

Significance analysis of measured values with an error probability of 0.01

| Property | Temperature | Coolant (10%) | p-value | Difference in mean values |
|---|---|---|---|---|
| Elongation at break | 23° C. | rhenus XT 46 FC | 0.5913 | Not significant |
| | | rhenus XY 190 FC | 0.1175 | Not significant |
| | −50° C. | rhenus XT 46 FC | 0.9918 | Not significant |
| | | rhenus XY 190 FC | 0.1909 | Not significant |
| Strength | 23° C. | rhenus XT 46 FC | 0.0729 | Not significant |
| | | rhenus XY 190 FC | 0.283 | Not significant |
| | −50° C. | rhenus XT 46 FC | 0.6965 | Not significant |
| | | rhenus XY 190 FC | 0.0263 | Not significant |
| Rigidity | 23° C. | rhenus XT 46 FC | 0.6251 | Not significant |
| | | rhenus XY 190 FC | 0.0004 | Significant (−2.4%) |
| | −50° C. | rhenus XT 46 FC | 0.2780 | Not significant |
| | | rhenus XY 190 FC | 0.1962 | Not significant |

In terms of the material properties determined, the specimens stored in rhenus XT 46 FC show no abnormalities at both 23° C. and −50° C. Taking into account a confidence interval of 99%, the changes in the measured values pertaining to rhenus XT 46 FC are not significant. Likewise, the material properties at −50° C. with regard to rhenus XY 190 FC do not differ from the reference specimen. With rhenus XY 190 FC, the tensile rigidity reduces by 2.4% at 23° C. No significant changes are observed in tensile elongation at break and tensile strength at 23° C. following storage in rhenus XY 190 FC. In the tensile test, therefore, the performance of rhenus XT 46 FC was slightly better than that of rhenus XY 190 FC. It was argued that diffusion facilitated by rhenus XY 190 FC into the composite material was a potential cause for the decrease in strength at 23° C. This aspect was investigated with the help of a fluorescence microscope. Prior to storage, the coolants were stained with a fluorescent marker and the CFRP specimens were examined after storage under a fluorescent microscope at 10× magnification. There was, however, no evidence that the coolants had penetrated into the matrix.

Taking into account the extreme test conditions (10% coolant, 1 week exposure at 60° C.), it may be assumed that no significant changes in terms of tensile elongation, strength and rigidity will be determined when the tested coolants are used in actual production. Wet machining of epoxy resin-based CFRPs with rhenus XT 46 FC or rhenus XY 190 FC is therefore not critical.

The invention claimed is:

1. A method for machining of fiber-reinforced composite materials comprising the step of applying to a fiber-reinforced composite material a coolant, wherein the coolant comprises one or more components selected from the group consisting of an oil component, an amino alcohol (alkanolamine), a corrosion inhibitor, an emulsifier, a defoamer and a biocide, and each of the following:

(a) a sulfurized hydrocarbon with 4 to 30 carbon atoms and 1 to 5 sulfur atoms and/or a sulfurized triglyceride with 10 to 20 carbon atoms in the fatty acid residue,
(b) an ethoxylated and/or propoxylated alkyl phosphate with 12 to 30 carbon atoms in the alkyl radical,
(c) a phosphoric acid ester with fatty alcohol polyglycol ether,
(d) a maleic acid dibutyl ester, polymerized with $C_{10-20}$-1-alkenes, and
(e) an epoxidized ester.

2. The method according to claim 1, wherein the sulfurized hydrocarbon in the coolant has a concentration of 4 to 15 wt % relative to the weight of the coolant.

3. The method according to claim 1, wherein the ethoxylated and/or propoxylated alkyl phosphate in the coolant has a concentration of 0.5 to 6 wt % relative to the weight of the coolant.

4. The method according to claim 1, wherein the ester of phosphoric acid and the ethoxylated and/or propoxylated alkyl phosphate in the coolant has a concentration of 0.5 to 6 wt % relative to the weight of the coolant.

5. The method according to claim 1, wherein the polymer of maleic acid dibutyl ester and $C_{10-20}$-1-alkenes in the coolant has a concentration of 2 to 6 wt % relative to the weight of the coolant.

6. The method according to claim 1, wherein the epoxidized ester in the coolant has a concentration of 1 to 6 wt % relative to the weight of the coolant.

7. The method according to claim 1, further comprising a non-ionic and an anionic emulsifier.

8. The method according to claim 1, wherein the biocide comprises phenoxyethanol.

* * * * *